(12) United States Patent
Delfino et al.

(10) Patent No.: US 9,694,517 B2
(45) Date of Patent: Jul. 4, 2017

(54) READY-TO-USE METAL REINFORCEMENT THE SURFACE OF WHICH IS PROVIDED WITH METAL-SULFIDE NANOPARTICLES

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Antonio Delfino, Clermont-Ferrand (FR); Milan Fedurco, Clermont-Ferrand (FR); Jean Paul Meraldi, Zurich (CH); Robert Nikolaus Grass, Zurich (CH); Wendelin Jan Stark, Langenthal (CH)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 195 days.

(21) Appl. No.: 14/653,598

(22) PCT Filed: Dec. 16, 2013

(86) PCT No.: PCT/EP2013/076717
§ 371 (c)(1),
(2) Date: Jun. 18, 2015

(87) PCT Pub. No.: WO2014/095731
PCT Pub. Date: Jun. 26, 2014

(65) Prior Publication Data
US 2015/0352900 A1  Dec. 10, 2015

(30) Foreign Application Priority Data
Dec. 20, 2012  (FR) ...................................... 12 62412

(51) Int. Cl.
*B29B 15/08*  (2006.01)
*B60C 9/00*  (2006.01)
*D07B 1/06*  (2006.01)

(52) U.S. Cl.
CPC .............. *B29B 15/08* (2013.01); *B60C 9/005* (2013.04); *B60C 9/0007* (2013.04);
(Continued)

(58) Field of Classification Search
CPC ....... B29B 15/08; B60C 9/005; B60C 9/0007; B60C 2009/0014; D07B 1/0666;
(Continued)

(56) References Cited

U.S. PATENT DOCUMENTS

| 4,333,787 A | 6/1982 | Erickson .................... 156/307.3 |
| 4,381,204 A | 4/1983 | Erickson ....................... 148/6.31 |

(Continued)

FOREIGN PATENT DOCUMENTS

| EP | 0 383 150 A1 | 8/1990 |
| EP | 1 967 645 A1 | 9/2008 |

(Continued)

OTHER PUBLICATIONS

W. S. Fulton, "Steel Tire Cord-Rubber Adhesion, Including the Contribution of Cobalt", Rubber Chemistry and Technology, vol. 78, pp. 426-457 (2005).

(Continued)

*Primary Examiner* — Michael C Miggins
(74) *Attorney, Agent, or Firm* — Fitzpatrick, Cella, Harper & Scinto

(57) ABSTRACT

A ready-for-use metal reinforcer, for example, of the wire or cord type, made of brass-coated carbon steel, is capable of adhering directly by vulcanization to a matrix of unsaturated rubber such as natural rubber. The surface of the reinforcer is provided with nanoparticles of at least one sulfide of a (Continued)

Figure 1:
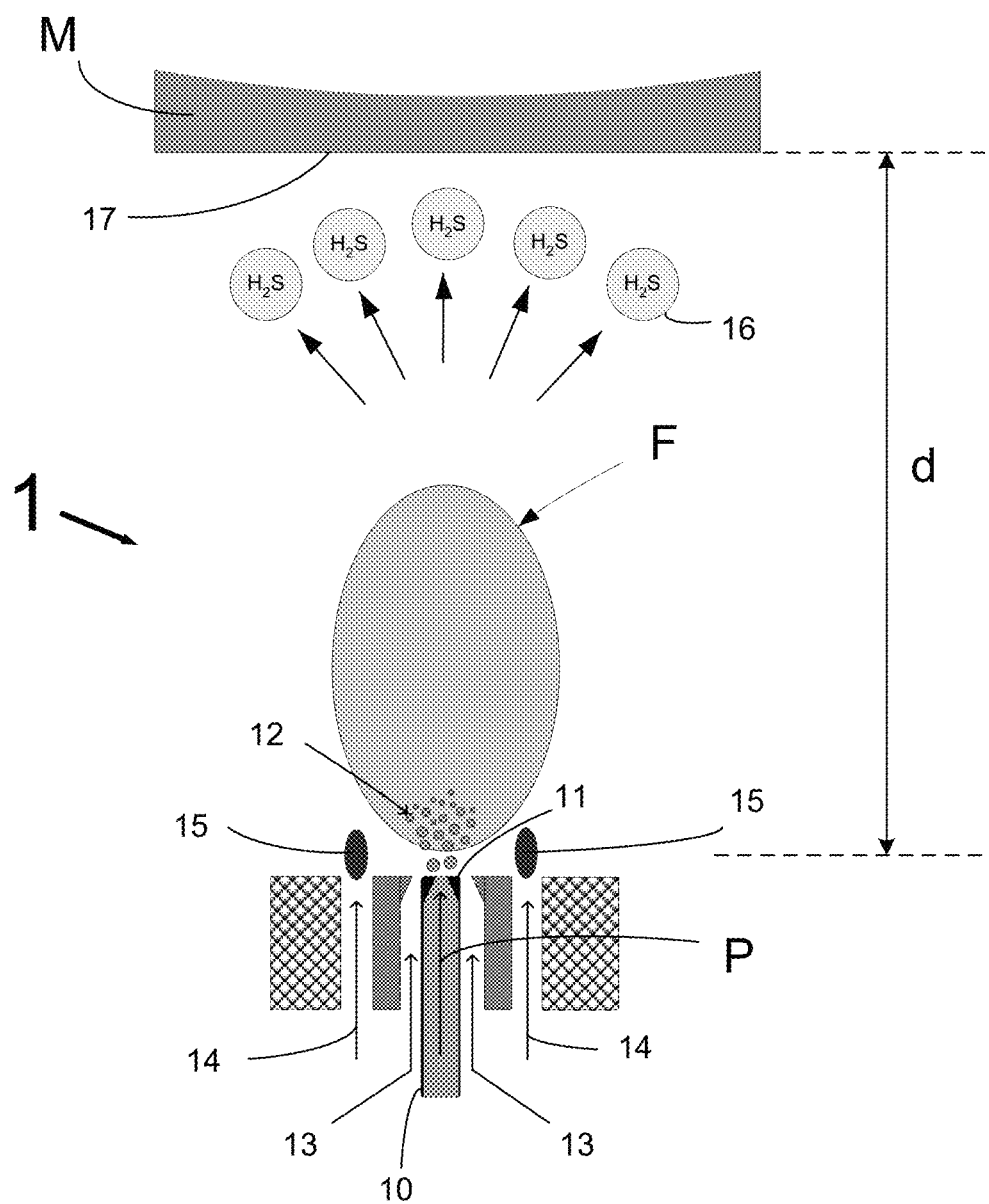

metal chosen from cobalt, copper, iron, zinc and the alloys comprising at least one of these elements. Such a reinforcer can be used as the reinforcing element of a finished article made of rubber, such as a tire.

10 Claims, 4 Drawing Sheets

(52) U.S. Cl.
CPC .... *D07B 1/0666* (2013.01); *B60C 2009/0014* (2013.04); *Y10T 428/12583* (2015.01); *Y10T 428/1355* (2015.01); *Y10T 428/2958* (2015.01); *Y10T 428/31678* (2015.04); *Y10T 442/2738* (2015.04)

(58) Field of Classification Search
CPC ....... Y10T 428/12583; Y10T 428/1355; Y10T 428/2958; Y10T 428/31678; Y10T 428/2738
See application file for complete search history.

(56) References Cited

U.S. PATENT DOCUMENTS

| | | | |
|---|---|---|---|
| 5,958,361 A | 9/1999 | Laine et al. | 423/592 |
| 6,887,566 B1 | 5/2005 | Hung et al. | 428/357 |
| 7,211,236 B2 | 5/2007 | Stark et al. | 423/592.1 |
| 7,941,439 B1 | 5/2011 | Lawrence et al. | 707/769 |
| 8,182,573 B2 | 5/2012 | Stark et al. | 75/362 |
| 8,231,369 B2 | 7/2012 | Rajala et al. | 425/7 |
| 8,658,188 B2 | 2/2014 | Stark et al. | 424/401 |
| 8,833,419 B2 | 9/2014 | Miyazaki et al. | 156/451 |
| 8,833,420 B2 | 9/2014 | Miyazaki et al. | 156/150 |
| 2004/0173300 A1 | 9/2004 | Yasunaga et al. | 152/565 |
| 2009/0025846 A1 | 1/2009 | Miyazaki et al. | 152/451 |
| 2009/0123357 A1 | 5/2009 | Chang et al. | 423/337 |
| 2009/0126604 A1 | 5/2009 | Akhtar et al. | 106/438 |
| 2009/0288747 A1 | 11/2009 | Miyazaki et al. | 152/451 |
| 2009/0317504 A1 | 12/2009 | Rajala et al. | 425/7 |
| 2010/0055340 A1 | 3/2010 | Park et al. | 427/452 |
| 2011/0244139 A1 | 10/2011 | Siffer et al. | 427/488 |
| 2012/0145297 A1 | 6/2012 | Miyazaki et al. | 152/451 |
| 2012/0199259 A1 | 8/2012 | Miyazaki et al. | 152/451 |

FOREIGN PATENT DOCUMENTS

| | | |
|---|---|---|
| EP | 1 975 309 A1 | 10/2008 |
| WO | 01/36332 A1 | 5/2001 |
| WO | 2004/005184 A1 | 1/2004 |
| WO | 2005/103900 A1 | 11/2005 |
| WO | 2007/028267 A1 | 3/2007 |
| WO | 2008/049954 A1 | 5/2008 |
| WO | 2011/020204 A1 | 2/2011 |
| WO | 2011/076746 A1 | 6/2011 |

OTHER PUBLICATIONS

B. Thiebaut, "Flame Spray Pyrolysis: A Unique Facility for the Production of Nanopowders", Platinum Metals Rev., 2011, 55, (2), 149-151.
International Search Report dated Mar. 17, 2014, issued by EPO in connection with International Application No. PCT/EP2013/076717.
E. K. Athanassiou et al., "Gas Phase Synthesis of Zinc Sulfide Nanoparticles", European Aerosol Conference 2009, Karlsruhe, Abstract T081A02.

READY-TO-USE METAL REINFORCEMENT THE SURFACE OF WHICH IS PROVIDED WITH METAL-SULFIDE NANOPARTICLES

1. Field of the Invention

The present invention relates to the metal reinforcers which can be used in the metal/rubber composites intended in particular for the manufacture of finished articles made of rubber, such as hoses, belts, plies or tyres, and also to the processes for the surface treatment of these metal reinforcers for the purpose of making it possible for them to adhere to unsaturated rubbers, such as natural rubber.

2. State of the Art

Composites of metal/rubber type, in particular for tyres, are well known. They are generally composed of a matrix made of unsaturated rubber, generally diene rubber, which can be crosslinked with sulphur, comprising metal reinforcing elements (or "reinforcers"), such as wires or cords made of carbon steel.

As they are subjected to very high stresses during the running of the tyres, in particular to repeated actions of compression, bending or variation in curvature, these composites must, in a known way, satisfy a large number of sometimes contradictory technical criteria, such as uniformity, flexibility, endurance in bending and compression, tensile strength, wear resistance and corrosion resistance, and must maintain this performance at a very high level for as long as possible.

It is easily understood that the adhesive interphase between the rubber and these reinforcers plays a dominating role in the persistence of this performance.

The conventional process for connecting the rubber compositions to carbon steel consists in coating the surface of the steel with brass (copper/zinc alloy), the bonding between the steel and the rubber matrix being provided by sulphurization of the brass (formation of zinc and copper sulphides) during the subsequent vulcanization (that is to say, three-dimensional crosslinking by sulphur) of the rubber matrix.

This sulphurization process is reflected in particular by the in situ formation of metal clusters at the surface of the brass known as "dendrites", around which it is assumed that the rubber matrix will anchor (by mechanical and chemical anchoring) during the vulcanization.

In addition, organic salts or complexes of cobalt are generally incorporated in this rubber matrix as adhesion-promoting additives. It is known that cobalt actively participates not only in the process of vulcanization of the rubber but also in that of dendritization of the brass by being incorporated in the dendrites themselves (by formation of Cu—Zn—Co intermetallic sulphides), according to complex mechanisms of redox reactions resulting, it is assumed, in the corrosion of the brass, in the dissolution of the metal and its redeposition in the form of these metal sulphide dendrites (sulphur-comprising dendrites). Reference may be made for further details to the RCT (*Rubber Chemistry and Technology*) publication, Vol. 78, pp. 426-457, author W. Stephen Fulton, entitled "*Steel tire cord-rubber adhesion, including the contribution of cobalt*").

However, it is also known that the presence of these cobalt compounds in rubber compositions renders the latter more sensitive to oxidation and to aging, so much so that the adhesion between the carbon steel and the rubber matrix is also liable to weaken over time as a result of the gradual change in the sulphides formed, under the effect of the various stresses encountered, in particular mechanical and/ or thermal stresses, it being possible for the above decomposition process in addition to be accelerated in the presence of moisture.

Their incorporation also significantly increases the cost of the rubber compositions, not to mention that it is desirable in the long run to eliminate cobalt from these compositions, due to recent developments in European regulations, cobalt and cobalt salts being regarded as relatively toxic to the environment.

For all the reasons set out above, manufacturers of metal/ rubber composites, in particular tyre manufacturers are on the lookout for novel adhesive solutions in order to adhesively bond metal reinforcers to rubber compositions, while overcoming, at least in part, the abovementioned disadvantages.

3. BRIEF DESCRIPTION OF THE INVENTION

In point of fact, during the research studies, the Applicant Companies have found a novel ready-for-use metal reinforcer which exhibits the major advantage of being able to be adhesively bonded directly, that is to say without adhesion primer or addition of metal salt, in particular of cobalt salt, to matrices of unsaturated rubber such as natural rubber.

Consequently, the invention relates to a ready-for-use metal reinforcer capable of adhering by vulcanization to an unsaturated rubber matrix, characterized in that its surface is provided with nanoparticles of at least one sulphide of a metal chosen from the group consisting of cobalt, copper, iron, zinc and the alloys comprising at one of these elements.

The invention also relates to the use of the reinforcer of the invention as reinforcing element of finished articles made of rubber, in particular of tyres, in particular of tyres intended to equip motor vehicles of the following types: passenger vehicles, SUV ("Sport Utility Vehicles"), two-wheel vehicles (in particular bicycles or motorcycles) or aircraft, as well industrial vehicles chosen from vans, heavy-duty vehicles—that is to say, underground, bus, heavy route transport vehicles (lorries, tractors or trailers) or off-road vehicles, such as agricultural vehicles or earth moving equipment—or other transportation or handling vehicles.

4. BRIEF DESCRIPTION OF THE FIGURES

Figure 2:
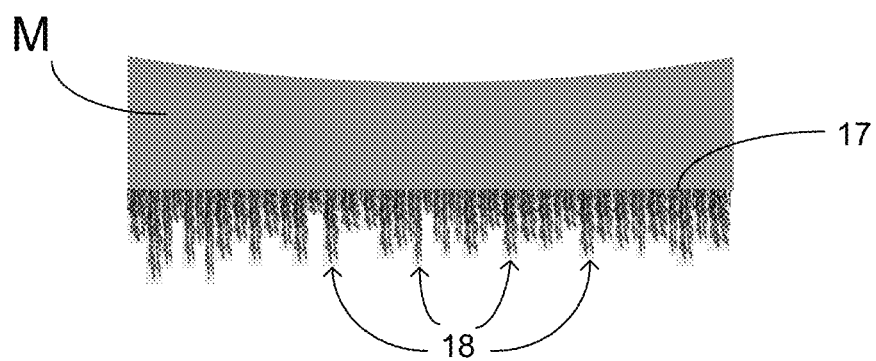
Figure 3:
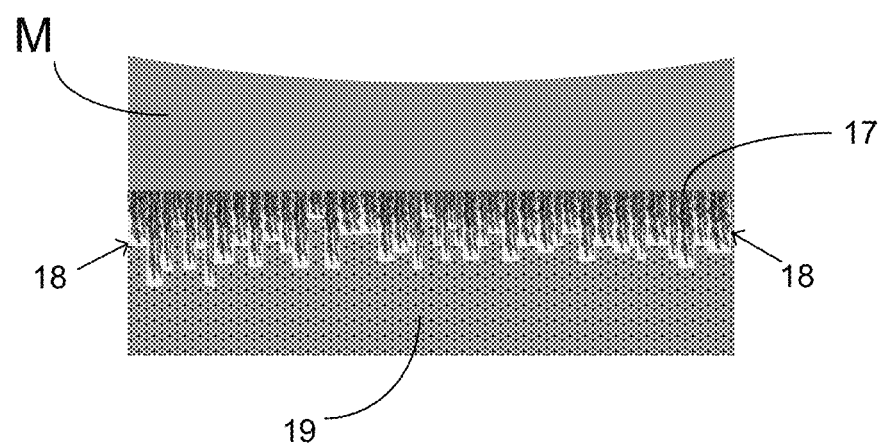
Figure 5:
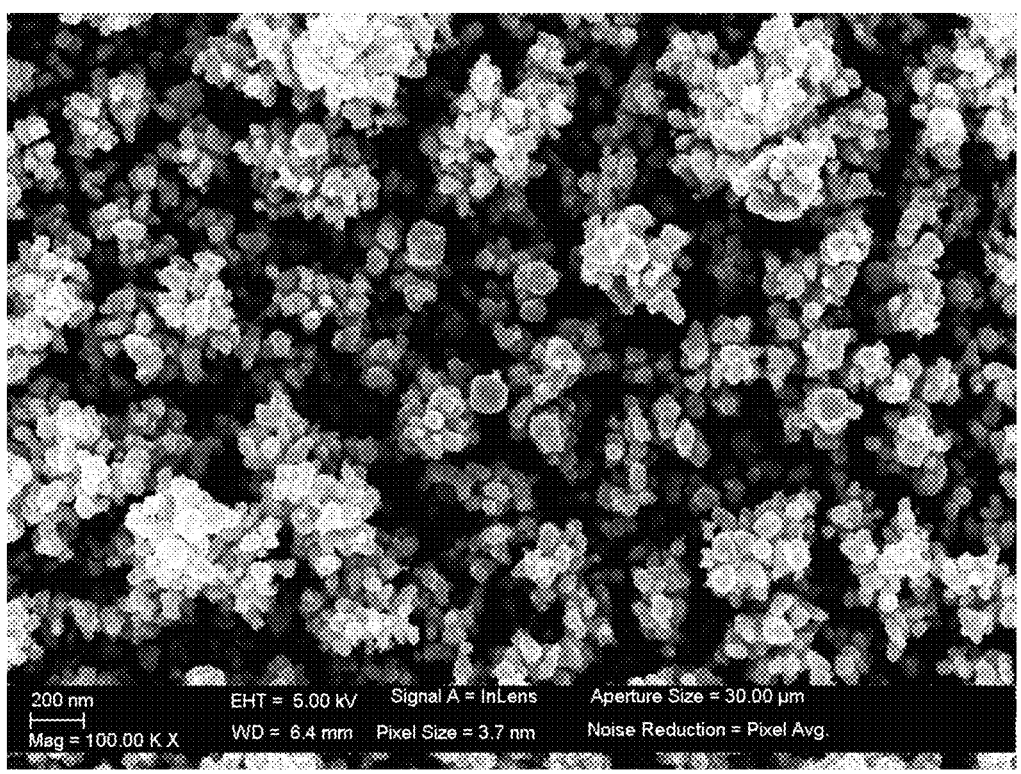

The invention and its advantages will be easily understood in the light of the detailed description and of the implementation examples which follow, and also of the figures relating to these examples, which represent or give a diagrammatic representation of:

FIG. 1 a scheme illustrating the principle of an FSP process which makes it possible to obtain a reinforcer in accordance with the invention and also an example of a device which can be used for the implementation of this process;

FIG. 2 a scheme illustrating the surface condition of the metal (M) once treated by FSP, with formation of dendrites of sulphur-comprising nanoparticles at the surface of the metal;

FIG. 3 a scheme illustrating the anchoring of a rubber matrix around the dendrites formed above by virtue of the FSP surface treatment;

FIG. 4 a reproduction of SEM photographs, taken at the surface of wires made of brass-coated carbon steel in accordance with the invention, demonstrating the presence of nanoparticles or dendrites at the surface of the treated wires;

FIG. 5 a reproduction of an SEM photograph, taken at the surface of a brass-coated steel plate in accordance with the invention after two successive FSP stages, a first stage of deposition of copper and a second stage of sulphurization of the surface copper, also demonstrating the presence of very fine dendrites or nanoparticles at the surface of the plate thus treated.

5. DETAILED DESCRIPTION OF THE INVENTION

In the present description, unless expressly indicated otherwise, the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The invention thus relates to a ready-for-use metal reinforcer capable of adhering by vulcanization to an unsaturated rubber matrix, characterized in that its surface is provided with nanoparticles of at least one sulphide of a metal chosen from the group consisting of cobalt (Co), copper (Cu), iron (Fe), zinc (Zn) and the metal alloys (whether they are, for example, binary, tertiary or quaternary) comprising at least one of these elements.

Reinforcer (or reinforcement element) of "metal" type is understood to mean, in the present patent application, by definition, a reinforcer, at least the periphery—acting as support or substrate for the metal sulphide nanoparticles—of which is made of metal. Preferably, the reinforcer is entirely made of metal, that is to say at the core and at its periphery.

Preferably, the reinforcer of the invention is provided in the form of a wire, of an assembly of wires, of a cord (layered cord, stranded cord, multistrand rope or any other type of cord), of a film or of a plate; more preferably, it is a wire, cord or film of great length, typically of greater than 100 m, generally of greater than 1000 m.

"Ready-for-use" reinforcer will be immediately understood by a person skilled in the art as concerning a reinforcer at the end of manufacture or unfinished manufactured reinforcer which can be used as is, directly, to reinforce an unsaturated rubber matrix.

By virtue of the FSP treatment which will be described in detail subsequently, the reinforcer of the invention is capable of adhering by vulcanization (curing) to an unsaturated rubber matrix and thus of reinforcing the latter, this being achieved directly, that is to say, on the one hand, without any additional treatment, in particular a sizing or bonding treatment, being necessary on this reinforcer and, on the other hand, without this unsaturated rubber matrix requiring the presence of a cobalt salt. The reinforcer of the invention, at this unfinished manufacturing stage, has not yet been incorporated in a rubber matrix to form a metal/rubber composite; in other words, it is devoid of rubber at its periphery.

Metal sulphide (metal hereinafter denoted "M") is understood to mean, in a known way, compounds which can be denoted symbolically by $M_xS_y$ (in this general expression, depending on the applicable stoichiometry and the nature of the metal, x and y, which are identical or different, are nonzero integers identical to or different from 1) or also can be denoted more simply as $M_xS$ (in this expression, y being conventionally equal to 1, x is then an integer or decimal number other than zero). It is obvious that this definition also encompasses the cases where several different metals (M then representing M1, M2, M3, and the like) are present at the surface of the treated body, in the form of mixed sulphides (for example of the $M1_{x1}M2_{x2}M3_{x3}S_y$ type) of these various metals.

The metal M is chosen from the group consisting of cobalt, copper, iron, zinc and their alloys (that is to say, the alloys comprising at least one of these elements). Preferably, it is chosen from the group consisting of copper, zinc and the alloys comprising at least one of these elements, that is to say the alloys of Cu and/or of Zn; mention will in particular be made, as metal elements (in addition to Cu and/or Zn) which can participate in the composition of such alloys of Cu and/or of Zn, of those chosen from the group consisting of cobalt, tin, iron, molybdenum and nickel.

The metal M is more particularly chosen from the group consisting of copper, zinc and brass (Cu/Zn alloy), thus by definition a metal capable of forming zinc or copper sulphides in the form of the nanoparticles described here.

The invention applies very particularly to brass, in particular in the applications where the metal reinforcer of the invention is intended to subsequently adhere to an unsaturated rubber matrix, such as natural rubber, in order to form a metal/rubber composite, such as those normally encountered in finished articles made of rubber, such as tyres.

Preferably, the metal reinforcer is made of steel, more preferably of carbon steel, as normally used in cords of steel cord type for tyres; however, it is, of course, possible to use other steels, for example stainless steels. When a carbon steel is used, its carbon content is preferably between 0.4% and 1.2%, in particular between 0.5% and 1.1%. The invention applies in particular to any steel of the steel cord type having normal strength ("NT" for "Normal Tensile"), having high strength ("HT" for "High Tensile"), having very high strength ("SHT" for "Super High Tensile") and having ultra-high strength ("UHT" for "Ultra High Tensile").

Preferably, this metal reinforcer is made of brass-coated steel (in particular carbon steel), that is to say made of steel coated with brass (alloy of copper and zinc), the brass then forming the base or the substrate on which the metal sulphide nanoparticles are formed.

Preferably, the nanoparticles are zinc or copper sulphide nanoparticles.

"Nanoparticles" are understood to mean, by definition, particles, the size (diameter or greater dimension in the case of anisometric particles) of which is greater than 1 nm (nanometer) and less than 1 μm (micrometer), in contrast in particular to particles referred to as microparticles, the size of which is equal to or greater than 1 μm.

The nanoparticles described here can be provided in the individual isolated state; usually, they are provided in the form of agglomerates of such nanoparticles, also known as "dendrites". Such agglomerates (clusters, packets) of nanoparticles are capable, in a known way, of deagglomerating to give these nanoparticles under the effect of an external force, for example under the action of mechanical work. "Nanoparticles" should thus be understood as meaning the indivisible assembly (i.e., which cannot be cut, divided or split) which is produced in the formation, the synthesis or the growth of the nanoparticles.

In the reinforcer of the invention, the nanoparticles as such (individual) have a mean size (diameter or greater dimension in the case of anisometric particles) which is preferably between 5 and 400 nm, more preferably within a range from 10 to 200 nm, in particular within a range from 10 to 100 nm (average calculated by number).

With regard to the agglomerates or dendrites of nanoparticles, their mean size (diameter or greater dimension in the case of anisometric dendrites) is preferably between 20 and 800 nm, more preferably within a range from 30 to 600 nm, in particular within a range from 40 to 400 nm (average calculated by number).

The reinforcer of the invention described above can be obtained by a novel process, the essential characteristic of which is that of comprising a stage of flame spray pyrolysis, abbreviated to "FSP", of a sulphur precursor which generates hydrogen sulphide in the flame. The gas ($H_2S$) formed is propelled, sprayed by the flame towards the surface of the body being treated, hence the name assigned to this technology. By virtue of the strong oxidizing power of the hydrogen sulphide with regard to the metal, metal sulphides are thus formed.

This process is therefore employed for the purpose of subsequently adhesively bonding the reinforcer thus treated to an ethylenically unsaturated rubber, that is to say a vulcanizable (crosslinking with sulphur) rubber, such as a diene elastomer.

Flame spray pyrolysis is a method well known today which has been essentially developed for the synthesis of ultrafine powders of simple or mixed oxides of various metals (e.g., $SiO_2$, $Al_2O_3$, $B_2O_3$, $ZrO_2$, $GeO_2$, $WO_3$, $Nb_2O_5$, $SnO_2$, MgO, ZnO, $Ce_xZr_{(1-x)}O_2$), having controlled morphologies, and/or their deposition on various substrates, this being the case starting from a great variety of metal precursors, generally in the form of sprayable organic or inorganic liquids which are preferably non-flammable; the liquids sprayed into the flame, on being consumed, give off in particular metal oxide nanoparticles which are sprayed by the flame itself onto these various substrates.

The principle of this method has been recalled, for example, in the recent publication (2011) by Johnson Matthey entitled *"Flame Spray Pyrolysis: a Unique Facility for the Production of Nanopowders"*, Platinum Metals Rev., 2011, 55, (2), 149-151. Numerous alternative FSP processes and reactors have also been described, by way of examples, in the patents or patent applications U.S. Pat. No. 5,958,361, WO 01/36332 or U.S. Pat. No. 6,887,566, WO 2004/005184 or U.S. Pat. No. 7,211,236, WO 2005/103900, WO 2007/028267 or U.S. Pat. No. 8 182 573, WO 2008/049954 or U.S. Pat. No. 8,231,369, US 2009/0123357, US 2009/0126604, US 2010/0055340 or WO 2011/020204.

"Sulphur precursor" or "sulphur-donating precursor", capable of generating hydrogen sulphide ($H_2S$) during its combustion in the flame, is understood to mean, in the present patent application, the product which is sprayed into the flame, whatever the form or the presentation of this product. It can be sulphur, a sulphur-comprising starting compound or else a more complex product, for example a composition or a solution, comprising sulphur in whatever form. It might be solid, for example in the form of a powder, sprayed and melted directly in the flame; it is preferably liquid at ambient temperature (20° C.). It can be organic or inorganic and monosulphide, disulphide or polysulphide.

If a sulphur-comprising starting compound is used and if the latter is not organic as such, it can advantageously be dissolved or dispersed in an organic solvent (such as, for example, benzene, cyclohexane, styrene or toluene) or an organic liquid, so as to form a sulphur-donating precursor which can then be described as organic. In the same way, if this sulphur-comprising starting compound is not liquid (for example in the solid sulphur form), it can advantageously be dispersed in an organic solvent or another appropriate liquid so as to form a sulphur-donating precursor which can be described as liquid.

The sulphur precursor is preferably an organic compound more preferably comprising from 1 to 15 carbon atoms; it can be monosulphide, disulphide or polysulphide, in particular of the saturated or unsaturated aliphatic or cycloaliphatic type, or of the aromatic type. More preferably still, it is a liquid organic compound, in particular of the non-flammable type.

More preferably, the sulphur precursor is an organic compound devoid of a nitrogen atom; more preferably still, it is also devoid of an oxygen atom and very preferably the sulphur precursor is an organic compound devoid of a heteroatom other than sulphur. Thus, very preferably, the sulphur precursor is an organic compound consisting exclusively of carbon, sulphur and hydrogen atoms.

Mention may be made, among the numerous examples of liquid organic compounds corresponding to the preferred definitions above, of the compounds of formulae I to XXIV below, and their derivatives, that is to say the compounds including, in their chemical structure, the entities of formulae I to XXIV.

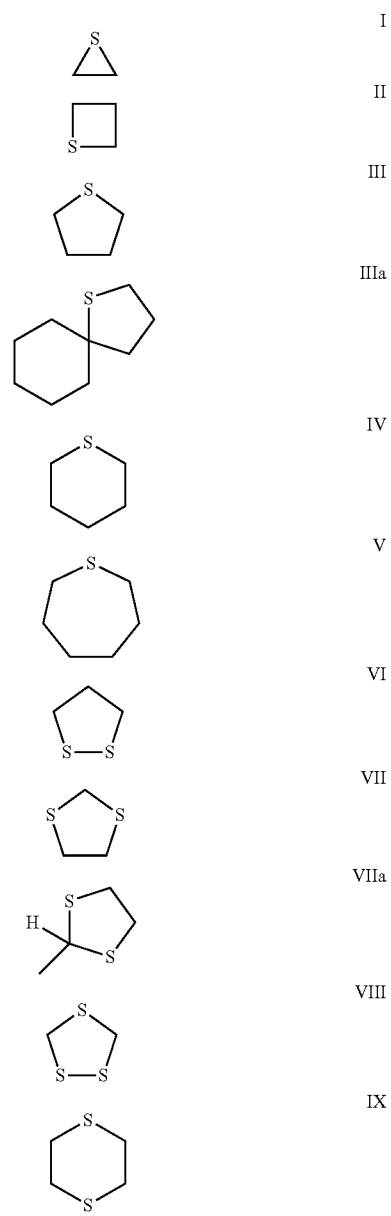

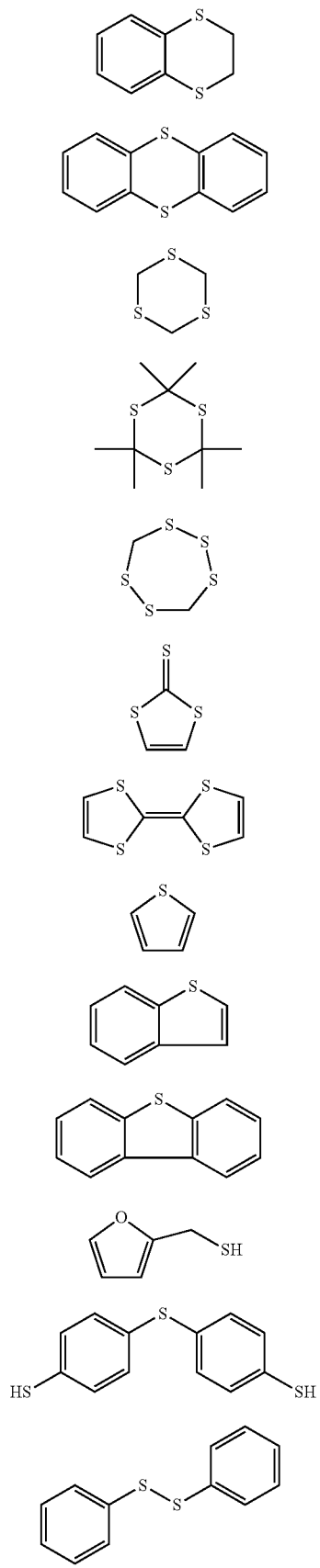
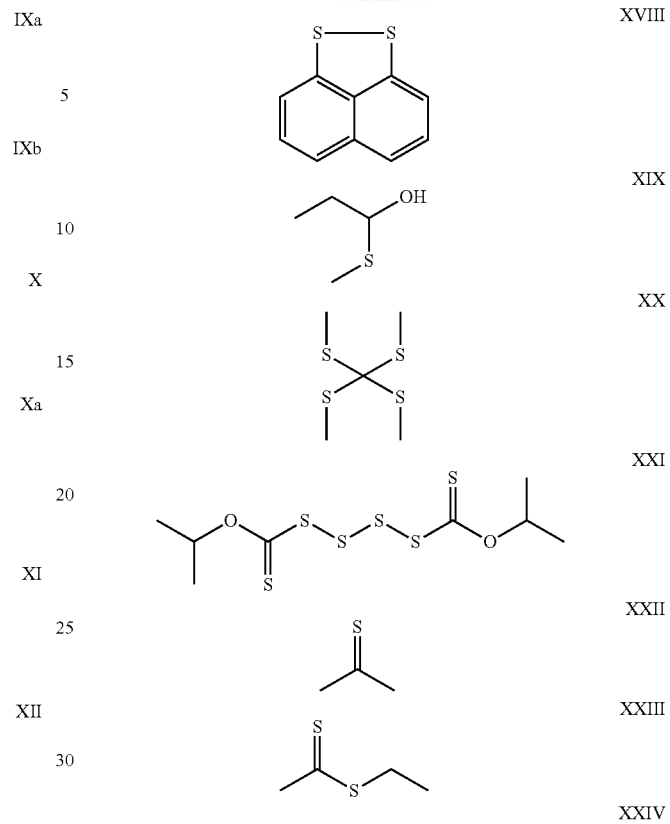

More preferably still, the organic sulphur-donating precursor is chosen from the following compounds: thiophene (formula XIV) and its derivatives (e.g., formula XIVa or XIVb); thiocarbonyl compounds (e.g., formulae XII, XXI, XXII, XXIII and XXIV); aliphatic or aromatic thiols (e.g., formulae XV and XVI); aliphatic or aromatic organic disulphides (e.g., formulae VI, VIII, XVII, XVIII, XXIV); aliphatic or aromatic organic polysulphides (e.g., formulae XI and XXI); acyclic thioethers (e.g., formulae XVI, XIX and XX) or cyclic thioethers, such as thiirane (formula I) and its derivatives, thietane (formula II) and its derivatives, thiolane (formula III) and its derivatives, (e.g., formula IIIa), thiane (formula IV) and its derivatives, thiepane (formula V) and its derivatives, dithiolanes (e.g., formula VII) and their derivatives, (e.g., formula VIIa), trithiolane (formula VIII), and its derivatives, dithianes (e.g., formula IX) and their derivatives, (e.g., formulae IXa and IXb), trithianes (e.g., formula X) and their derivatives, (e.g., formula Xa); thioesters (e.g., formula XXIII).

More preferably still, this organic sulphur-donating precursor is chosen from the group consisting of thiophene and its derivatives, aliphatic or aromatic organic disulphides, aliphatic or aromatic organic polysulphides, acyclic or cyclic thioethers, and the mixtures of such compounds.

More particularly still, the sulphur-donating precursor is thiophene or a thiophene derivative. This sulphur-comprising organic compound, of formula $C_4H_4S$, which is volatile and nonflammable, has here the direct function of sulphur donor; it can also advantageously be used as organic solvent.

The FSP treatment can be carried out at any temperature, of course lower than the melting point of the metal M. It might be carried out at a temperature, in particular at a temperature close to ambient temperature (23° C.). However, in order to optimize the duration and the effectiveness of the treatment, the temperature of the surface metal, during the sulphurization, is preferably between 50° C. and 500° C., more preferably between 100° C. and 350° C.

The appended FIG. 1 illustrates, highly diagrammatically, without observing a specific scale, the principle of the FSP (flame spray pyrolysis) process and also an example of a device (1) which can be used in the implementation of this process.

The principle of the method is to inject a sulphur-donating precursor (P) and then to comminute it in a flame using a propellant and oxidizing gas; the combustion of the precursor (P) in the flame (F) makes possible the formation of the targeted entity (in this case, in accordance with the invention, hydrogen sulphide $H_2S$).

The device 1 of this example essentially comprises three respective feeds:
  atomization means (10, 11), comprising at least one capillary (10) and one nozzle (11) for feeding with fuel or precursor (P), in this instance in a liquid form, the role of which is to eject and comminute the precursor in the form of fine droplets (12), the shape of the jet being dictated by the specific atomization conditions; these atomization means (10, 11) are, of course, preceded by a pump of appropriate proportions (in the examples which follow, a gerotor rotary volumetric micropump, model mzr-2905 from HNP Mikrosysteme GmbH), not represented in this figure for simplicity;
  a feed of oxidation gas (13) (using a pump not represented in the diagram) which ejects the oxidizing gas into the outlet region of the feed nozzle (11), the role of which, on the one hand, is to propel the droplets (12) into the flame (F) and, on the other hand, to oxidize the precursor (P) in order to convert it into hydrogen sulphide ($H_2S$);
  finally, a feed of support gas (ignition and combustion gas) (14), for example a mixture of methane and oxygen, which feeds two small flames (secondary flames) (15) for their part intended to ignite the droplets (12) of precursor (P) for formation of the main flame (F).

It is thus the flame (F) generated by the combustion gas (14) and the oxidizing gas (13) which constitutes the FSP reactor, a thermal reactor at very high temperature since the temperature inside the flame (F), depending on the preferred operating conditions given above, is greater than 500° C., for example between 600° C. and 800° C.

It is the combustion in the flame (F) of the sulphur-comprising precursor (P) in the presence of oxygen (13) which will generate the targeted hydrogen sulphide (16) and also other gaseous entities depending on the specific nature of the precursor used, these entities preferably being neutral or reducing, as explained in more detail below.

A person skilled in the art will understand that the FSP sulphurization treatment is in this instance carried out in an atmosphere "depleted in oxygen" ("reducing flame" or "reducing atmosphere" conditions), that is to say with the minimum of oxygen necessary (the trend is towards incomplete combustion), without which there will be no formation of hydrogen sulphide (and of other gaseous reducing entities); preferably, the oxygen content of the combustion chamber (measured immediately at the chamber outlet) is less than 200 ppm, in particular within a range from 5 to 200 ppm, preferably less than 100 ppm, in particular within a range from 10 to 100 ppm. The whole of the combustion chamber (in the examples which follow, a simple fitted-out closed glove box) is thus swept with a stream of inert gas, such as nitrogen. The height of the main flame (F) is typically between 5 and 10 cm.

The flame is placed, as a function of the desired intensity of the treatment, at a variable distance from the surface (17) of the metal M to be treated, which distance a person skilled in the art can easily define as a function of the specific conditions for implementing the invention. This distance, denoted "d" in FIG. 1, measured between the base of the flame (F) and the surface (17) of the metal M, is preferably between 50 and 250 mm, in particular between 60 and 180 mm.

It is the flame (F), by virtue of its kinetic energy, which acts as propellant for the gas $H_2S$ (16) towards the surface (17) of the metal M to be treated. In other words, in accordance with the invention, a gas ($H_2S$) is generated which is projected and which chemically attacks the metal M with this gas.

In this instance, which is a distinguishing feature of the process of the invention, nanoparticles of metal sulphides $M_xS$ are created by erosion, without any external contribution of metal being necessary, in contrast to the FSP techniques of the prior art (synthesis of metal oxides) mentioned in the introduction to the present account.

The duration of the treatment is typically from a few seconds to a few minutes, preferably from a few seconds to a few tens of seconds, depending of the specific conditions for implementing the invention, according in particular to the nature of the metal M, according to whether the body treated is stationary or, on the contrary, is moving in front of the flame at a given rate which can, for example, vary from a few tens of cm/min to several tens of m/min.

The plants which can be used for the implementation of the process of the invention are, of course, not limited to the examples and embodiments described above. Thus it is that, in order to treat large surface areas and/or large amounts of reinforcers, such as, for example, wires, cords, films or plates, in particular at high speed, the plants used might comprise a combination of several flames in line.

The invention also applies to the cases where other entities formed in the flame (F) or another (at least one other) flame, in particular nongaseous entities, such as, for example, particles of metal or of metal oxide, contributed by precursors other than the sulphur precursor described above, will be sprayed, simultaneously or nonsimultaneously, at the surface of the metal M to be treated.

FIG. 2 represents, highly diagrammatically, the surface condition of the metal M once it has been treated by FSP as indicated above.

Subsequent to the chemical attack (erosion) by the gas $H_2S$, a highly specific roughness which may be described as "nanoroughness" (by analogy with what is customarily referred to as microroughness) is obtained: the surface (17) of the metal M has been provided with a multitude of metal sulphide $M_xS$ nanoparticles (in this case, $Cu_xS$ and ZnS in the case where M is brass) of nanometric size, generally agglomerated in the form of dendrites (18) themselves in nanometric size.

By virtue of FSP sulphurization treatment of the invention, the aim of which, it should be remembered, is to cause the surface metal to adhere firmly to a matrix of ethylenically unsaturated (thus crosslinkable with sulphur) polymer, a body (in particular a reinforcer, such as wire, cord, film or plate) having an at least partially metallic (in particular brass-coated) surface is obtained which can be described as "ready-for-use": at this stage, this body or reinforcer is devoid of any polymer or rubber matrix at its periphery; it is ready for use as it is, without any adhesion primer or adhesion activator, such as a cobalt salt, as reinforcing element of an unsaturated rubber or polymer matrix, such as natural rubber.

FIG. 3 gives a diagrammatic representation of the anchoring of a rubber matrix (19) around the dendrites (18) previously formed by virtue of the FSP surface treatment, with an of course highly simplified representation of the metal/rubber interphase, once the surface (17) of the metal (M) has come into contact with the rubber matrix (19) (for example a rubber composition based on a diene elastomer, such as natural rubber) and once the assembly has been subsequently vulcanized.

The presence of these nanoparticles and dendrites (18) of metal sulphides $M_xS$ makes it possible to obtain a strong and permanent adhesion between the metal M and the rubber, as is demonstrated in particular in the implementational examples which follow.

6. IMPLEMENTATIONAL EXAMPLES OF THE INVENTION

Test I

During a first test, a plate made of brass-coated (Cu/Zn: 60/40) carbon steel was subjected to an FSP treatment, carried out using the device represented diagrammatically in FIG. 1 (closed glove box swept with a stream of nitrogen) in an atmosphere depleted in oxygen ($O_2$ content of the combustion chamber, measured immediately at the chamber outlet, of less than 100 ppm).

The plate, with a thickness equal to approximately 3 mm (thickness of the brass layer of between 200 and 500 nm) was immobile and was treated for a period of time of 5 s at a distance "d" from the flame equal to approximately 70 mm.

The combustion chamber 1 was in this instance fed continuously with approximately 5 ml/min of pure thiophene (precursor P), 5 l/min of oxygen (oxidation gas 13) and a mixture of methane and oxygen (support gas 14) ($CH_4$:1.2 l/min; $O_2$:2.2 l/min). The height of the flame (F) was between 6 and 7 cm and the temperature inside the flame was equal to approximately 700° C.

In the present implementational example and for the various operating conditions above, the combustion and the oxidation of the precursor P (thiophene) resulted in a gas composition, measured immediately at the chamber outlet by mass spectrometry (Pfeiffer Quadstar 100), which was as follows: approximately 10 ppm of $H_2S$, 500 ppm of $SO_2$, less than 100 ppm of $O_2$, 1% of $H_2O$, 1% of $H_2$ and 0.5% of $CO_2$ (mol %).

It should be noted that, in other tests, the thiophene was used in the state diluted (for example at 10% by weight) in an organic solvent (for example a mixture of 1 part of THF per 2 parts of 1,2-ethylhexanoic acid), this being done while keeping constant the ratio of the volume of dispersing gas (5 l/min of $O_2$) to the volume of fuel (5 ml/min of thiophene or of thiophene equivalent in the case of a dilution).

The plate made of brass-coated steel in accordance with the invention, thus treated by FSP, was then, once cooled, sandwiched between two layers of a conventional rubber composition for a passenger vehicle tyre belt reinforcement, based on natural rubber, on carbon black and silica as filler and on a vulcanization system (sulphur and sulphenamide accelerator), this composition being devoid of cobalt salt.

The metal/rubber composite test specimen thus prepared was then placed under a press and the combination was cured at 165° C. for 30 min under a pressure of 20 bar.

After vulcanization of the rubber, excellent adhesive bonding between the rubber matrix and the metal plate was obtained, despite the absence of cobalt salt in the rubber matrix: this is because, during peeling tests carried out both at ambient temperature (23° C.) and at high temperature (100° C.), it was found that the failure had occurred systematically in the rubber matrix itself and not at the interface between metal and rubber.

It is essential to note that, during comparative tests carried out under the same conditions (no cobalt salt in the rubber matrix) apart from the absence of the FSP treatment according to the invention, it was found that the brass plate did not adhesively bond to the rubber.

Test II

Other FSP treatments were carried out under the same flame conditions as above, this time on wires made of brass-coated carbon steel (diameter of approximately 0.30 mm) having high strength (for cords of "Steelcord" type for tyres).

During the treatment, these wires progressed forward continually, by virtue of a motorized robot, at a uniform speed (in this case, in these examples, at 60 cm/min) and at a distance "d" from the base of the flame which could vary automatically within a broad range of values.

Figure 4A:
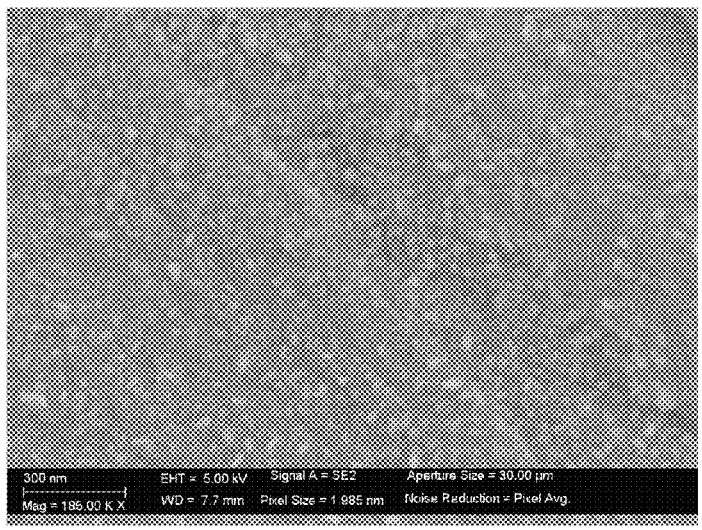
Figure 4B:
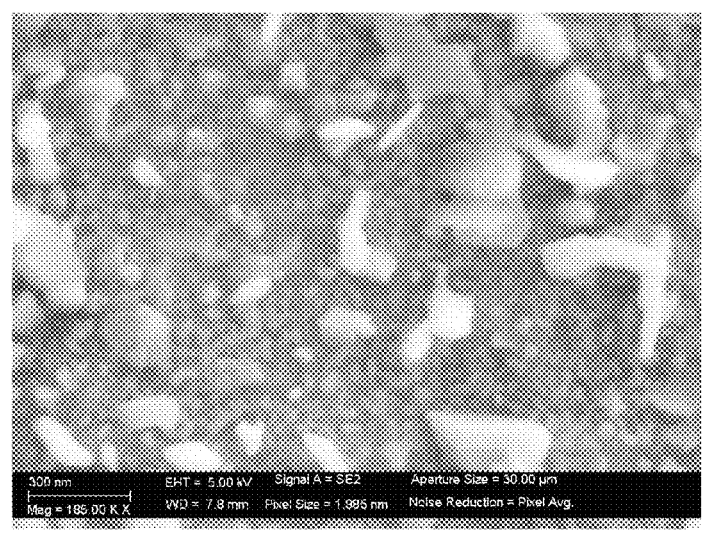
Figure 4C:
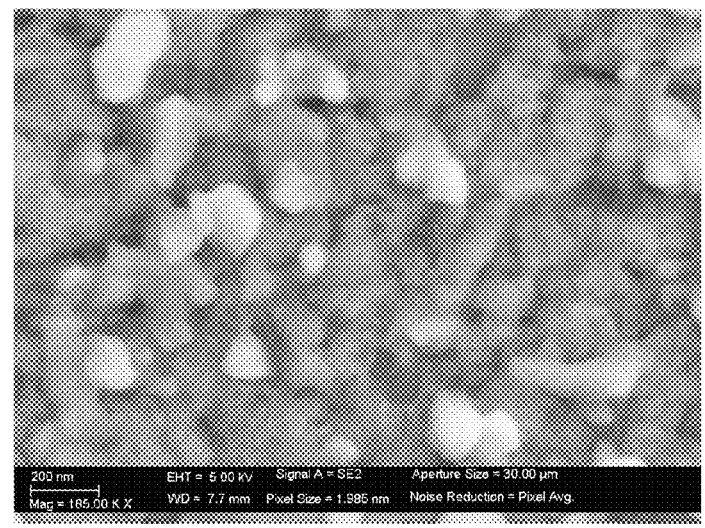

The appended FIG. 4 reproduces the three SEM photographs (5 kV; magnification 185 000) which were taken at the surface of the wires thus treated. The surface (brass M) of the plate, during its treatment, was located respectively at a distance "d" equal to 200 mm (FIG. 4A), 150 mm (FIG. 4B) and 100 mm (FIG. 4C) from the flame.

With regard to these reproductions of FIG. 4, 1 cm is equivalent to approximately 200 nm (nanometers). A more or less marked surface nanoroughness, existing in the form of more or less agglomerated nanoparticles, is visible on each of these three photographs, for which nanoparticles it can be easily seen that the size, typically from a few tens (FIG. 4A) to a few hundreds of nm (maximum of approximately 400 nm in these examples) (FIGS. 4A and 4B), increases when the distance "d" decreases, that is to say when the intensity of the FSP treatment increases.

The surface of the wires thus treated in accordance with the invention was analysed by EDS (5 kV). This EDS (Energy Dispersive Spectroscopy) technique makes it possible, it should be remembered, to determine the % by weight of each element present at the surface of the sample analysed. It has been used to measure the degree of sulphurization of the surface after the FSP treatment: for the three conditions above (respectively FIG. 4A, 4B and 4C), the sulphur content measured was approximately 5.5%, 12% and 25% by weight respectively. The analysis on a control wire (untreated by FSP) indicated the absence of sulphur (at any rate, below the detection limit).

Test III

The appended FIG. 5 reproduces an SEM photograph (5 kV—magnification 100 000) taken at the surface of a plate made of brass-coated carbon steel identical to that of Test I but which has been subjected to a treatment this time comprising 2 consecutive FSP stages:

- a first stage of synthesis and deposition of copper nanoparticles, according to a method of deposition (by external contribution of metal) as described in the introduction to the present account; the copper precursor consisted of a solution of copper ethylhexanoate in an inorganic solvent (THF); then
- a second stage in accordance with the invention of sulphurization of the surface thus copper-coated beforehand, according to the FSP method (attacked by $H_2S$ for formation of copper sulphides $Cu_xS$) described in Test I (same operating conditions). The plate, during its treatment, was located at a distance "d" equal to approximately 70 mm from the flame.

In this reproduction of FIG. 5, 7 mm is approximately equivalent to 200 nm. This photograph itself also very clearly demonstrates the presence of a particularly fine surface nanoroughness in the form of nanoparticles, agglomerated in the form of dendrites; it can be easily seen that the mean size of these nanoparticles, measured in the plane of the photograph, is markedly less than 200 nm.

The presence of these dendrites (18) of metal sulphides ($Cu_xS$) makes it possible to obtain a strong and permanent adhesion between the metal M and the rubber (19) by virtue of its strong mechanical and chemical anchoring, as illustrated in FIG. 3 commented on above. Thus, cobalt salts or other metal salts can be dispensed with as adhesion promoters in the rubber compositions intended to be connected to brass-coated metal reinforcers.

The FSP process described above exhibits numerous advantages:

- the amount of sulphur (in the form of sulphur-comprising nanoparticles and dendrites) deposited at the surface 17 of the metal M (thus at the metal/rubber future interphase in rubber reinforcing applications), and the size and the geometry of the nanoparticles and dendrites of metal sulphides (18) can be easily adjusted by the operating parameters of the FSP reactor;
- this being the case without having to intervene with regard to the formulation, in particular with regard to the vulcanization system, of the rubber matrix intended to subsequently coat the metal;
- large amounts of metal sulphides $M_xS$, in particular copper and/or zinc sulphides, m can be deposited on the surface of the metal M (in particular brass) without risk of otherwise penalizing the rubber properties;
- nanoparticles of metal (e.g. copper, zinc, cobalt) other than nanoparticles of metal sulphides ($M_xS$) can advantageously be added, incorporated in the dendrites of sulphides for the purpose of further improving, if need be, the adhesive performance of the reinforce of the invention.

The invention claimed is:

1. A ready-for-use metal reinforcer capable of adhering by vulcanization to an unsaturated rubber matrix, wherein the ready-for-use metal reinforcer comprises a surface provided with nanoparticles of at least one sulfide of a metal selected from the group consisting of cobalt, copper, iron, zinc, and alloys comprising at least one of these elements.

2. The ready-for-use metal reinforcer according to claim 1, wherein the metal is selected from the group consisting of copper, zinc and alloys comprising at least one of these elements.

3. The ready-for-use metal reinforcer according to claim 2, wherein the nanoparticles are nanoparticles of zinc sulfide or copper sulfide.

4. The ready-for-use metal reinforcer according to claim 1 further comprising a wire, an assembly of wires, a cord, a film or a plate.

5. The ready-for-use metal reinforcer according to claim 4 comprising a wire or a cord.

6. The ready-for-use metal reinforcer according to claim 1, wherein the metal reinforcer is made of steel.

7. The ready-for-use metal reinforcer according to claim 6, the steel being a carbon steel.

8. The ready-for-use metal reinforcer according to claim 6, wherein the steel is coated with brass.

9. A finished article made of rubber comprising the ready-for-use metal reinforcer according to claim 1 as a reinforcing element.

10. The finished article according to claim 9, wherein the finished article is a tire.

* * * * *